No. 660,184. Patented Oct. 23, 1900.
A. E. FLATTER.
TIRE.
(Application filed Sept. 7, 1900.)
(No Model.)

Witnesses
F. E. Alden
H. S. Shepard

A. E. Flatter Inventor
by C. A. Snow & Co.
Attorneys

THE NORRIS PETERS CO., PHOTO-LITHO., WASHINGTON, D. C.

UNITED STATES PATENT OFFICE.

ALBERT E. FLATTER, OF GREENVILLE, OHIO.

TIRE.

SPECIFICATION forming part of Letters Patent No. 660,184, dated October 23, 1900.

Application filed September 7, 1900. Serial No. 29,292. (No model.)

*To all whom it may concern:*

Be it known that I, ALBERT E. FLATTER, a citizen of the United States, residing at Greenville, in the county of Darke and State of Ohio, have invented a new and useful Tire, of which the following is a specification.

This invention relates to tires, and has for its object to provide an improved detachable cushion-tire which is arranged to be conveniently applied to ordinary vehicle-wheels having the usual metallic tire and without removing the latter, so that either tire may be used, according to the character of the roads. It is furthermore designed to facilitate the application and removal of the tire and also to provide for preventing lateral play or looseness of the tire and creeping thereof.

With this and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
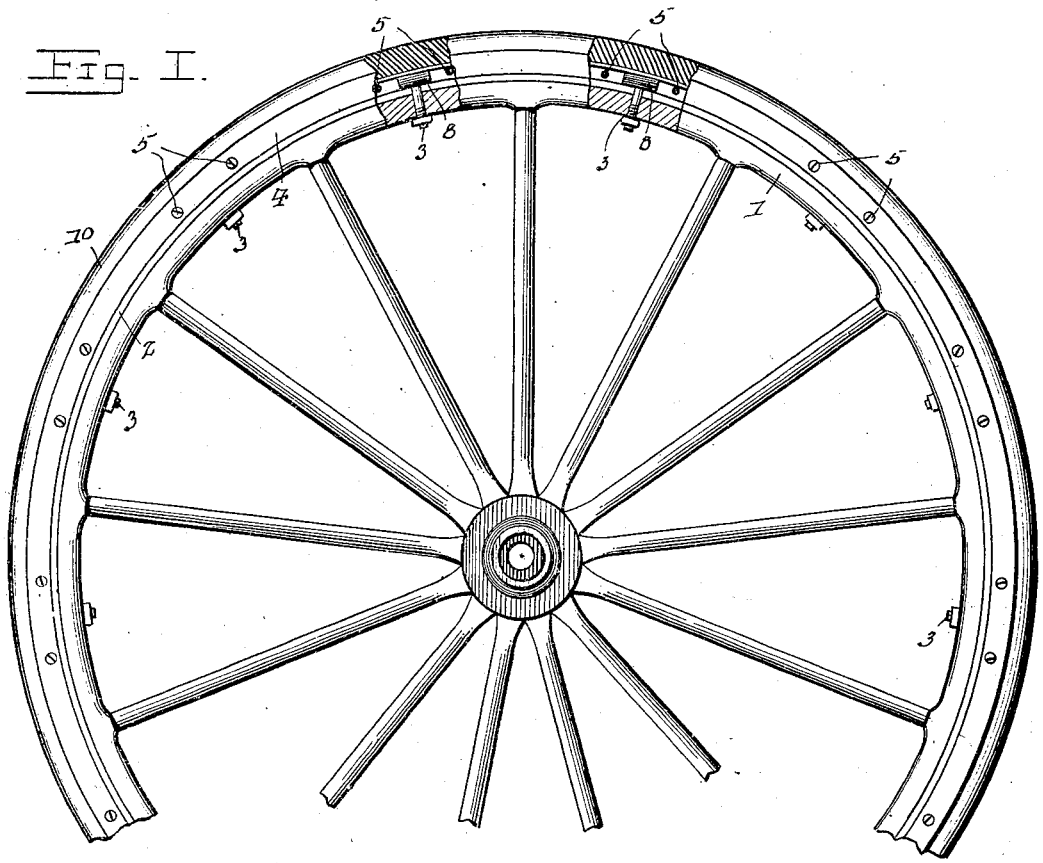
Figure 2:
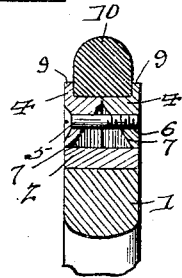
Figure 3:
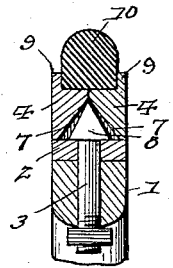
Figure 4:

In the drawings, Figure 1 is a side elevation of an ordinary vehicle-wheel having the present invention applied thereto, parts being broken away to show the connection between the tire and the wheel. Fig. 2 is a transverse sectional view taken on the line 2 2 of Fig. 1. Fig. 3 is a similar view taken on the line 3 3 of Fig. 1. Fig. 4 is a detail perspective view of one of the fastening-bolts for preventing lateral looseness of the tire.

Corresponding parts are designated by like characters of reference in all of the figures of the drawings.

Referring to the drawings, 1 designates the rim of an ordinary vehicle-wheel having the usual flat metallic tire 2, secured in place by means of the tire-bolts 3, that extend through the tire and the rim.

In carrying out the present invention there are provided the opposite rings or bands 4, which are duplicates and are designed to snugly embrace the tire 2 or the rim of the wheel. As best shown in Figs. 2 and 3 of the drawings, it will be apparent that the rings or bands are applied from opposite sides of the wheel and are connected by means of a plurality of transverse fastenings 5, the heads of which are countersunk in the outer side of one ring, so that the latter may be free from projections, and their opposite ends are screw-threaded and take into correspondingly-screw-threaded openings 6 in the other ring.

To prevent lateral displacement of the rings from the wheel, the inner opposing faces of the rings are recessed, as at 7, so that the combined recesses form an inner marginal groove next to the rim of the wheel and for the reception of the head 8 of each tire-bolt 3, as indicated in Figs. 1 and 3. Each recess opens out through the inner marginal edge of the ring and inclines toward the inner lateral face thereof, so that the groove is wedge-shaped.

Each ring is provided with an outer marginal flange 9, which is flush with the lateral outer face thereof, whereby the two flanges are designed to form a seat for the rubber or similar strip 10, which is clamped between the flanges.

In applying the present form of tire to a wheel the usual tire-bolts are substituted by the headed bolts and the rings are applied from opposite sides of the wheel, so as to embrace the heads of the bolts and receive the same within the groove formed by the recessed inner faces of the rings. The lateral fastenings 5 are then passed through the rings and the cushioned ring or strip is placed between the flanges of the rings, after which the lateral fastenings are tightened, so as to firmly bind the rings upon the rubber strip.

From the foregoing description it will be seen that the rubber strip is detachably connected to the rings and the latter are held against lateral displacement by means of the heads of the tire-bolts fitting in the groove at the inner sides of the rings. It is preferable to arrange the lateral fastenings 5 in pairs, the members of which are disposed adjacent to the opposite ends of the heads of the respective tire-bolts, so as to prevent creeping of the detachable tire upon the rim of the wheel.

In the formation of the groove it is preferable to provide the opposing faces of the rings with beveled portions, which begin at the inner margin of the rings and incline away from the flanges of the respective rings, whereby the beveled faces of the two rings converge and meet adjacent to the outer marginal edges of the rings. In view of this wedge shape of the groove the heads of the tire-bolts are preferably triangular in cross-section, so as to fit within the groove.

It will now be apparent that the present form of cushion-tire may be conveniently applied to any ordinary vehicle-wheel without altering the latter, and the device may be readily removed, so that the ordinary metallic tire may be used when the roads are muddy.

What is claimed is—

1. The combination with a vehicle-wheel, of a pair of rings embracing the peripheral edge of the wheel, the inner sides of the rings being recessed and forming a marginal groove next to the wheel, means for clamping the rings together, a cushioning-strip held between the rings, and headed fastenings carried by the rim of the wheel and having their heads received within the groove.

2. The combination with a vehicle-wheel, of a pair of rings embracing the peripheral edge of the wheel, and provided with inner opposite recesses forming a groove next to the rim of the wheel, and also having outwardly-directed marginal flanges, fastening devices clamping the rings together, a cushioned-tire strip clamped between the flanges, and headed fastenings carried by the rim of the wheel, the heads being received within the groove of the combined rings.

3. The combination with a vehicle-wheel, of a ring embracing the periphery of the wheel and provided in its inner face with a marginal groove next to the rim of the wheel, a cushioned-tire strip secured to the outer marginal edge of the ring, headed fastenings carried by the rim of the wheel and having their heads received within the groove, and pairs of lateral fastenings carried by the ring and located at opposite sides of the heads of the fastenings.

4. The combination with a vehicle-wheel, of a pair of opposite rings embracing the rim of the wheel, and having their inner sides recessed and forming a continuous groove next to the rim of the wheel, and also provided with outer marginal flanges, headed fastenings carried by the rim of the wheel and having their heads fitted in the groove, lateral fastenings extending through the rings and arranged adjacent to the opposite sides of the respective heads of the fastenings, and a cushioned-tire strip clamped between the flanges of the rings.

5. A removable cushioned tire for vehicle-wheels, comprising opposite rings, having their inner faces recessed and forming an inner marginal groove, and also provided with outer marginal flanges, a cushioned-tire strip clamped between the flanges, lateral fastenings connecting the rings and passing transversely through the groove, and headed fastenings having their heads received within the groove and between adjacent lateral fastenings.

In testimony that I claim the foregoing as my own I have hereto affixed my signature in the presence of two witnesses.

ALBERT E. FLATTER.

Witnesses:
   JAS. B. KOLP,
   H. L. YOUNT.